United States Patent
Salonen

(10) Patent No.: US 9,313,161 B2
(45) Date of Patent: *Apr. 12, 2016

(54) BOOKING METHOD AND SYSTEM

(75) Inventor: Jukka Salonen, Espoo (FI)

(73) Assignee: BOOKIT OY AJANVARAUSPALVELU, Helsinki (FI)

( * ) Notice: Subject to any disclaimer, the term of this patent is extended or adjusted under 35 U.S.C. 154(b) by 1613 days.

This patent is subject to a terminal disclaimer.

(21) Appl. No.: 10/734,352

(22) Filed: Dec. 11, 2003

(65) Prior Publication Data

US 2004/0128158 A1  Jul. 1, 2004

Related U.S. Application Data

(63) Continuation of application No. 10/227,194, filed on Aug. 21, 2002, now Pat. No. 7,406,429.

(30) Foreign Application Priority Data

Aug. 21, 2001  (FI) ...................................... 20011680

(51) Int. Cl.
  *G06Q 10/00* (2012.01)
  *H04L 12/58* (2006.01)
  (Continued)

(52) U.S. Cl.
  CPC ............... *H04L 51/18* (2013.01); *G06Q 10/02* (2013.01); *G06Q 10/025* (2013.01); *G06Q 10/109* (2013.01); *G06Q 10/1095* (2013.01);
  (Continued)

(58) Field of Classification Search
  CPC ............. G06Q 10/02; G06Q 20/4016; H04M 3/42382; H04M 1/72522; H04M 1/72547; H04M 1/72583; H04L 29/12726; H04L 51/38; H04L 12/5895; H04L 51/28; H04W 4/24; H04W 4/26; H04W 4/02
  See application file for complete search history.

(56) References Cited

U.S. PATENT DOCUMENTS 5,592,666 A   1/1997 Perez
5,838,965 A   11/1998 Kavanagh et al.
(Continued)

FOREIGN PATENT DOCUMENTS

CN   1675637 A   9/2005
EP   0881802 A1  2/1998
(Continued)

OTHER PUBLICATIONS bmd wireless AG, Wireless Application messaging server, Unknown 2004.
Content Gateway, Version 4.0. "Development and Billing manual," Jan. 1, 2005, Telia Sonera Finland Oy, www.sonera.fi/files/sonera.fi/.
Elisa Plc's press release. "Innovative solution receives 2004 European Good PRactice Award in oppupational health and safety," and the appendix: "BookIT case.pdf," Nov. 22, 2004.
(Continued)

*Primary Examiner* — George Chen
(74) *Attorney, Agent, or Firm* — Barnes & Thornburg LLP

(57) ABSTRACT

The invention relates to a method and system for booking reservations in a booking system and synchronizing bookings among several booking systems. The system comprises at least one booking system; at least one service provider; a mediator service; a client, and at least one client terminal device that can be a mobile device and that includes a dialog. The client uses the dialog to enter information into the system and the mediator receives inquiries and answers from the at least one booking system, the at least one service provider, and the at least one client. The mediator transfers and adapts information between them. The method and system are particularly suited for use with mobile phone users by Small Message Service messages.

32 Claims, 8 Drawing Sheets

(51) Int. Cl.

| | | |
|---|---|---|
| *G06Q 10/02* | (2012.01) | |
| *G06Q 10/10* | (2012.01) | |
| *G06Q 20/40* | (2012.01) | |
| *H04M 3/42* | (2006.01) | |
| *H04L 29/12* | (2006.01) | |
| *G06Q 30/06* | (2012.01) | |
| *G06Q 20/32* | (2012.01) | |
| *H04W 4/12* | (2009.01) | |
| *H04W 12/06* | (2009.01) | |
| *H04L 29/08* | (2006.01) | |
| *H04L 29/06* | (2006.01) | |
| *G06Q 30/02* | (2012.01) | |
| *H04W 4/14* | (2009.01) | |
| *G06Q 50/14* | (2012.01) | |
| *G08G 1/00* | (2006.01) | |

(52) U.S. Cl.
CPC .......... *G06Q20/322* (2013.01); *G06Q 20/3221* (2013.01); *G06Q 20/40* (2013.01); *G06Q 30/0267* (2013.01); *G06Q 30/0601* (2013.01); *G06Q 30/0609* (2013.01); *G06Q 30/0623* (2013.01); *G06Q 50/14* (2013.01); *H04L 29/12726* (2013.01); *H04L 67/10* (2013.01); *H04L 67/42* (2013.01); *H04M 3/42382* (2013.01); *H04W 4/12* (2013.01); *H04W 4/14* (2013.01); *H04W 12/06* (2013.01); *G08G 1/207* (2013.01)

(56) References Cited

U.S. PATENT DOCUMENTS

| | | | |
|---|---|---|---|
| 5,940,818 | A | 8/1999 | Malloy et al. |
| 5,987,467 | A | 11/1999 | Ross et al. |
| 6,003,036 | A | 12/1999 | Martin |
| 6,047,270 | A * | 4/2000 | Joao et al. ............ 705/44 |
| 6,085,100 | A * | 7/2000 | Tarnanen ............ 455/466 |
| 6,104,870 | A | 8/2000 | Frick et al. |
| 6,199,076 | B1 | 3/2001 | Logan et al. |
| 6,539,360 | B1 | 3/2003 | Kadaba |
| 6,560,456 | B1 | 5/2003 | Lohtia et al. |
| 6,564,261 | B1 | 5/2003 | Gudjonsson et al. |
| 6,625,461 | B1 | 9/2003 | Bertacchi |
| 6,639,919 | B2 | 10/2003 | Kroninger et al. |
| 6,772,336 | B1 | 8/2004 | Dixon, Jr. |
| 6,990,332 | B2 | 1/2006 | Vihinen |
| 7,149,537 | B1 | 12/2006 | Kupsh et al. |
| 7,154,060 | B2 | 12/2006 | Rosenbaum et al. |
| 7,222,081 | B1 | 5/2007 | Sone |
| 7,272,662 | B2 * | 9/2007 | Chesnais et al. ............ 709/246 |
| 7,406,429 | B2 | 7/2008 | Salonen |
| 7,451,118 | B2 | 11/2008 | McMeen et al. |
| 7,610,208 | B2 | 10/2009 | Salonen |
| 7,610,224 | B2 | 10/2009 | Spiegel |
| 7,619,584 | B2 | 11/2009 | Wolf |
| 7,660,397 | B2 | 2/2010 | Heen et al. |
| 8,050,664 | B2 | 11/2011 | Salonen |
| 2001/0037264 | A1 * | 11/2001 | Husemann et al. ............ 705/26 |
| 2001/0049785 | A1 | 12/2001 | Kawan et al. |
| 2002/0028686 | A1 * | 3/2002 | Kagi ............ 455/466 |
| 2002/0032589 | A1 | 3/2002 | Shah |
| 2002/0035539 | A1 * | 3/2002 | O'Connell ............ 705/39 |
| 2002/0059146 | A1 | 5/2002 | Keech |
| 2002/0080822 | A1 | 6/2002 | Brown et al. |
| 2002/0104007 | A1 | 8/2002 | Moodie et al. |
| 2002/0111914 | A1 | 8/2002 | Terada et al. |
| 2002/0165000 | A1 | 11/2002 | Fok |
| 2002/0173319 | A1 * | 11/2002 | Fostick ............ 455/466 |
| 2002/0178122 | A1 * | 11/2002 | Maes ............ 705/64 |
| 2002/0180696 | A1 | 12/2002 | Maritzen et al. |
| 2002/0184509 | A1 | 12/2002 | Scheidt et al. |
| 2002/0188562 | A1 | 12/2002 | Igarashi et al. |
| 2002/0191795 | A1 * | 12/2002 | Wills ............ 380/270 |
| 2003/0005126 | A1 | 1/2003 | Schwartz et al. |
| 2003/0101071 | A1 | 5/2003 | Salonen |
| 2003/0163536 | A1 | 8/2003 | Pettine, Jr. |
| 2003/0211844 | A1 | 11/2003 | Omori |
| 2004/0128158 | A1 | 7/2004 | Salonen |
| 2004/0128173 | A1 | 7/2004 | Salonen |
| 2004/0139318 | A1 | 7/2004 | Fiala et al. |
| 2004/0157628 | A1 | 8/2004 | Daniel et al. |
| 2004/0185883 | A1 | 9/2004 | Rukman |
| 2004/0198322 | A1 | 10/2004 | Mercer |
| 2004/0203619 | A1 * | 10/2004 | Tissot ............ 455/412.1 |
| 2005/0027608 | A1 | 2/2005 | Wiesmuller et al. |
| 2005/0054286 | A1 | 3/2005 | Kanjilal et al. |
| 2005/0065995 | A1 | 3/2005 | Milstein et al. |
| 2005/0102230 | A1 | 5/2005 | Haidar |
| 2005/0171738 | A1 | 8/2005 | Kadaba |
| 2005/0246209 | A1 | 11/2005 | Salonen |
| 2005/0268107 | A1 | 12/2005 | Harris et al. |
| 2006/0010085 | A1 | 1/2006 | McMeen et al. |
| 2006/0040682 | A1 | 2/2006 | Goertz et al. |
| 2006/0075139 | A1 | 4/2006 | Jungck |
| 2006/0131385 | A1 | 6/2006 | Kim |
| 2006/0224407 | A1 | 10/2006 | Mills |
| 2006/0271551 | A1 | 11/2006 | Suojasto |
| 2007/0010266 | A1 | 1/2007 | Chaudhuri |
| 2007/0047533 | A1 | 3/2007 | Criddle et al. |
| 2007/0135101 | A1 | 6/2007 | Ramati et al. |
| 2007/0143230 | A1 | 6/2007 | Narainsamy et al. |
| 2007/0239578 | A1 | 10/2007 | Gaida |
| 2008/0147408 | A1 | 6/2008 | Da Palma et al. |
| 2008/0317224 | A1 | 12/2008 | Salonen |
| 2009/0281929 | A1 | 11/2009 | Boitet et al. |

FOREIGN PATENT DOCUMENTS

| | | |
|---|---|---|
| EP | 0967754 A2 | 12/1999 |
| EP | 1065899 A1 | 3/2001 |
| EP | 1546938 | 8/2002 |
| EP | 1458201 A1 | 9/2004 |
| FI | 20011680 | 2/2003 |
| FI | 000117663 B1 | 12/2006 |
| FI | 20060387 | 10/2007 |
| FI | 000118586 B | 12/2007 |
| GB | 2391646 A | 11/2004 |
| GB | 2435565 A | 8/2007 |
| KR | 20040013261 A | 2/2004 |
| WO | 02/067602 A1 | 8/2002 |
| WO | 02067602 A1 | 8/2002 |
| WO | 2004019223 A1 | 3/2004 |
| WO | 2004/019223 A1 | 4/2004 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Elisa Plc's press release. "Bookit Ltd and Elisa implement a handy mobile phone-enabled check-in service for Finnair," Jun. 9, 2004, www.elisa.fi.

Empower Interactive Group Ltd. "Virtual Mobile Redirector—Product Information Document," Unknown 2001.

Finnair Plc's press release. "Finnair to introduce the world's easiest check-in-with a text message," Jun. 9, 2004, www.bookit.net/news.

Finnish Search Report, dated May 4, 2006.

Finnish Search Report, dated Jun. 3, 2009.

Penttinen, J. "GSM-tekniikka, WSOY," Unknown 1999, pp. 155-157, 222, & 331-332, Porvoo.

Kauppalehti, "Mobiilipalvelujen oltava yksinkertaisia: BookIT:n Jukka Salonen uskoo tavallisiin tekstiviesteihin," Heikki Nenonen, Jun. 9, 2005, p. 19.

Mouly et al. "The GSM System for mobile Communications," Unknown 1992, pp. 556-560, Palaiseau.

Verkkouutiset. "Sonera tarjoaa matkaviestinoperaattoreille Content Gateway-palvelualustaa," Feb. 21, 2001, www.verkkouutiset.fi.

* cited by examiner

BOOKING METHOD AND SYSTEM

This application is a continuation of application Ser. No. 10/227,194 filed on Aug. 21, 2002, now U.S. Pat. No. 7,406,429 which application is hereby incorporated by reference herein in its entirety.

FIELD OF THE INVENTION

The present invention relates to telecommunications. In particular, the invention relates to a method and system for booking a reservation in a booking system and synchronizing bookings in several booking systems comprising at least one booking systems; involving at least one service provider; a mediator service; a client, and at least one client terminal device that can be a mobile device and that includes a dialogue. In addition, the system comprises telecommunication connections that are used to connect the booking systems, the service providers, the mediator, and the client terminal device.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

There are many methods to exchange information between services. Speaking of services that include booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

As these examples show, there have been lots of efforts to build systems that can synchronize booking systems. A common problem with all of these existing solutions is that they do not provide common semantics for different systems. For example, if an entry is tentative, different systems may interpret it in different ways.

Another problem is that booking systems have multiple different and usually quite complex user interfaces. If a customer wants to both make an appointment with a dentist and book a taxi to take him or her there, the customer needs to enter all the booking information to both booking systems in different ways.

One more problem is that it becomes challenging to manage client replies, if a client has been given a number of questions. For example, it makes sense to use SMS text messages to ask client which option he or she chooses, because in many countries, like in Finland, it is very common to communicate with SMS text messages and they create revenues to operators. However, if a client replies to several inquires by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

Objective of the Invention

The objective of the invention is to eliminate the drawbacks referred above or at least significantly alleviate them. The invention enables new kind of value adding services that are essential especially for mobile services.

It is a further object of the invention to provide a method and system capable of making booking type transactions involving at least one service provider and a plurality of users who are each communicating with a mobile telephone capable of receiving and sending short text messages.

It is a further object of the invention to provide a method and system capable of making booking type transactions between a plurality of service providers and a plurality of users who are each communicating with a mobile telephone capable of receiving and sending short text messages.

BRIEF DESCRIPTION OF THE DRAWINGS

In the following section, the invention will be described in detail by the aid of a few examples of its embodiments, in which.

DESCRIPTION OF THE INVENTION

Figure 1:
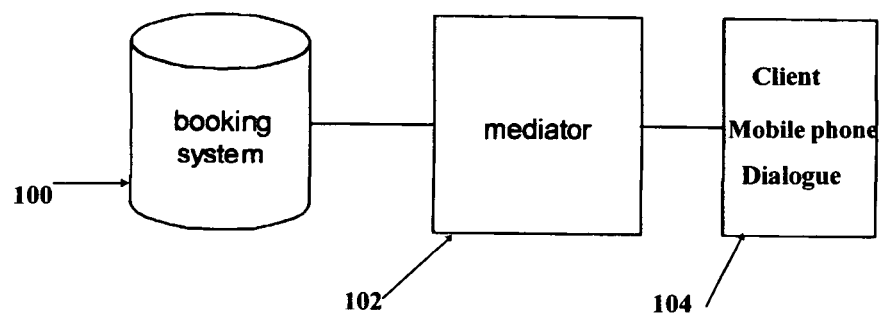
FIG. 1 represents one advantageous system in accordance with the invention.

The invention relates to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

The booking system in accordance with the invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and a well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a clients need, for example coordination of an airline booking with transportation to the airport.

FIG. 1 is a diagram of the simplest system comprising a single service provider booking system 100 for a single service provider, a mediator 102 communicating with the service provider over a network, and a user with a mobile phone having a dialogue entered thereon.

Figure 2:
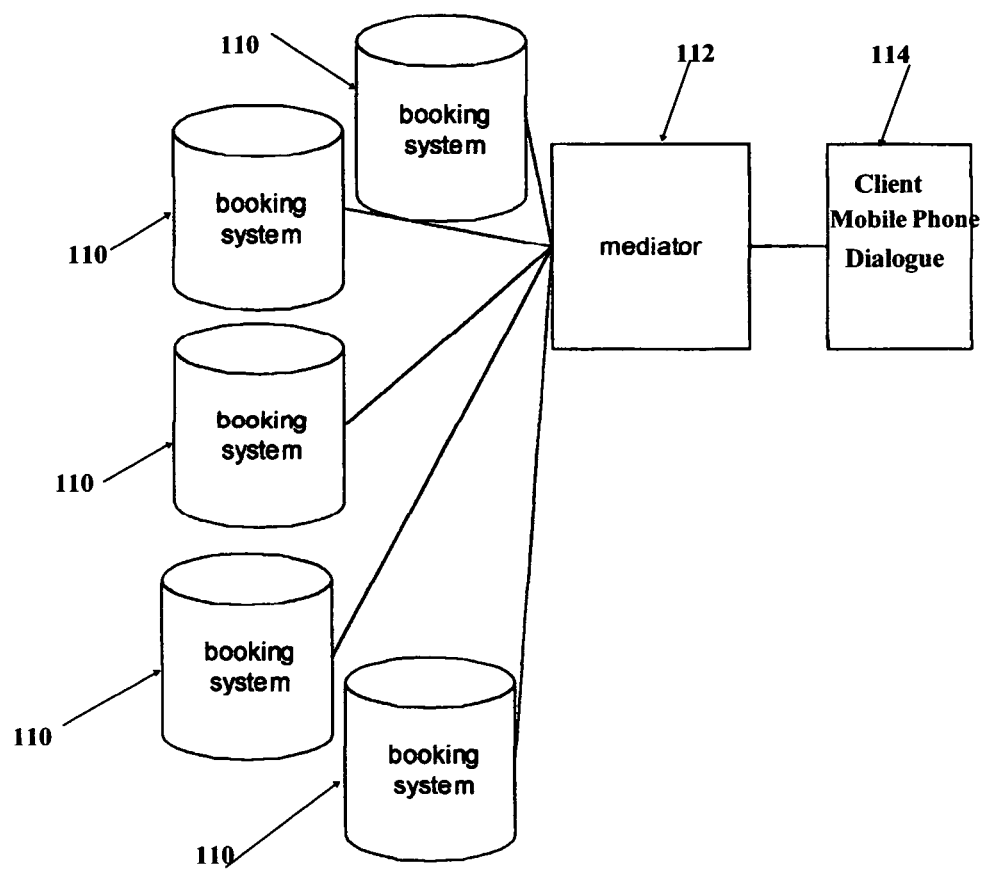
FIG. 2 represents a second advantageous system in accordance with the invention.

FIG. 2 shows a plurality of service provider booking systems communicating with a mediator over a network.

Figure 3:
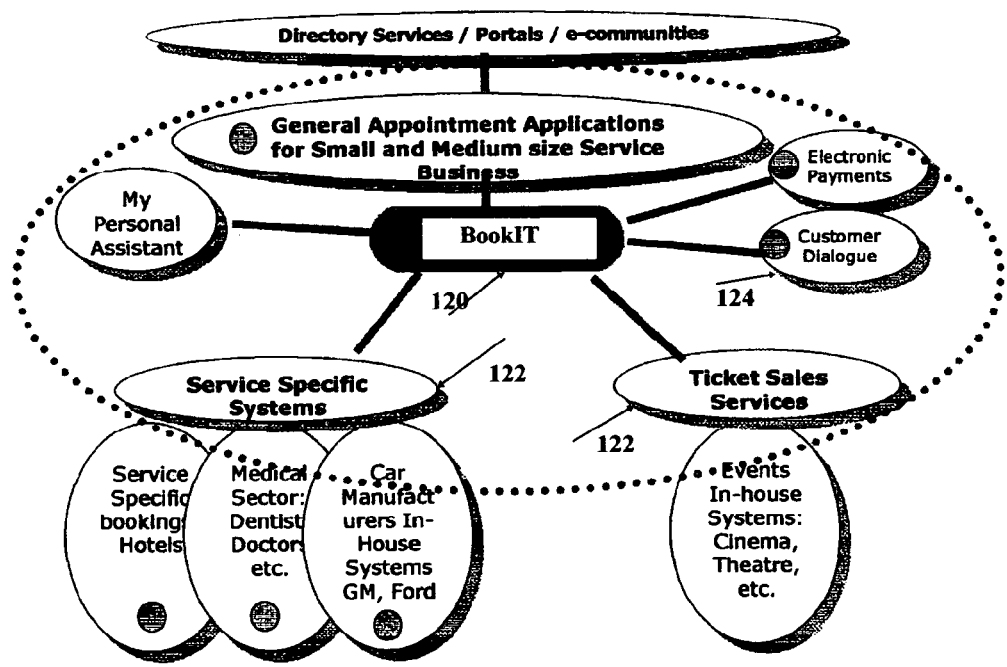
FIG. 3 represents a third advantageous system in accordance with the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:
1. There is a predetermined set of dialogues in the system. Their content and the possible choices are set in advance. For example, if a client books a flight, a dialogue always offers certain other bookings. Client's prior actions are not taken into consideration.
2. There is an unlimited number of dynamic or "intelligent" dialogues that are based on, for instance, a profile that a client has created himself or herself, usage history records, and client's location. Simple logic supports decisions. It is a low-level expert system.
3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
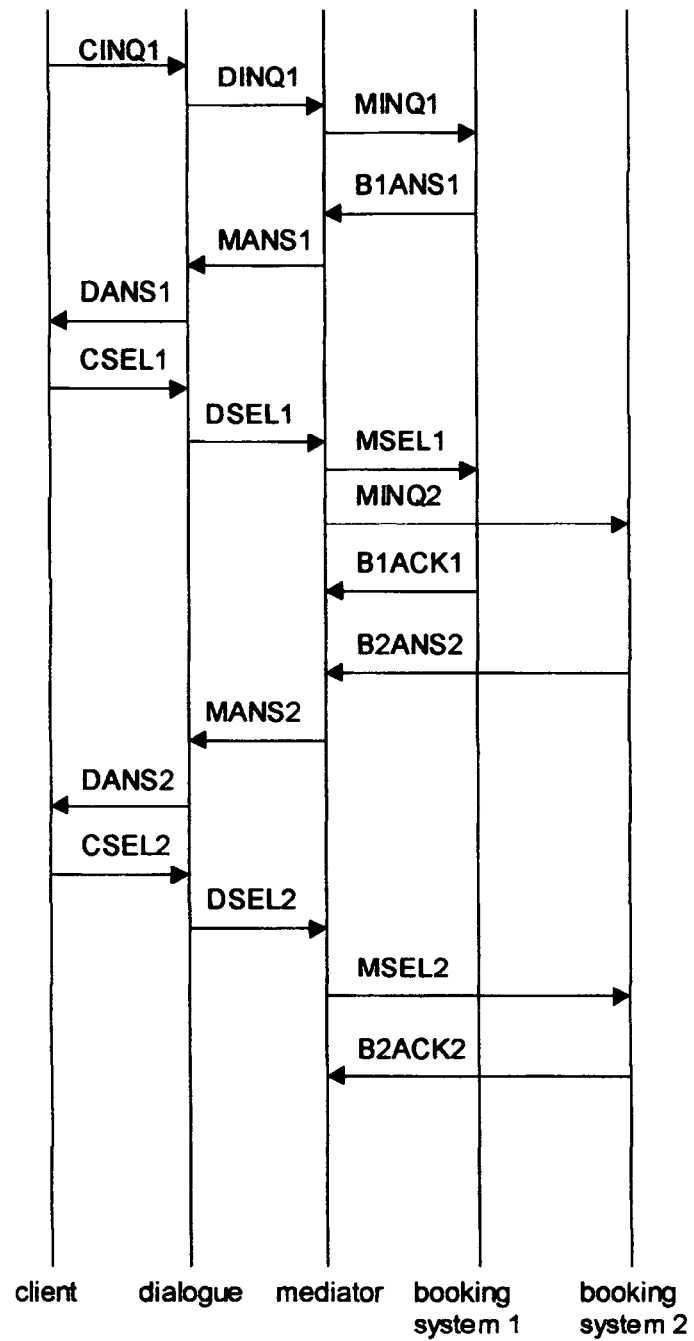
FIG. 4 is one advantageous example of a sequence diagram representing messages transmitted within a system in accordance with the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
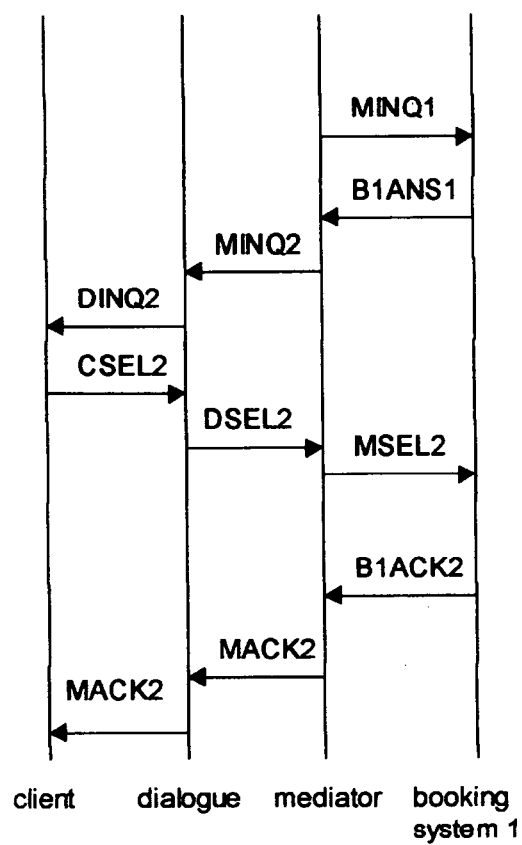
FIG. 5 is a second advantageous example of a sequence diagram representing messages transmitted within a system in accordance with the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQ1, was initiated by the mediator.

EXAMPLE 1

A Preferred Booking System

A preferred booking system according to the invention, is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a suggested start-time (ISO time-stamp w/time zone)
b suggested start-location (coordinates)
c suggested end-time (ISO time-stamp w/time zone)
d suggested end-location (coordinates)

4. Confirming

Time and location as it is accepted by the resources that have accepted. Data related to this phase:
a accepted start-time (ISO time-stamp w/time zone)
b accepted start-location (coordinates)
c accepted end-time (ISO time-stamp w/time zone)
d accepted end-location (coordinates)

By default the data is copied from the Planning phase.

In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a actual start-time (ISO time-stamp w/time zone)
b actual start-location (coordinates)
c actual end-time (ISO time-stamp w/time zone)
d actual end-location (coordinates)
e products used, extras, mileage, . . . .

By default the data is copied from the Confirming phase.

1. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| Phase/Data | Identifying | Resources | Suggested time | Accepted time | Task's work related | Accounting | Closing |
|---|---|---|---|---|---|---|---|
| Filing | X | | | | | | *X* |
| Requesting | X | X | | | | | *X* |
| Scheduling | X | X | X | | | | *X* |
| Confirming | X | X | X | X | | | *X* |
| Working | X | X | X | X | X | | *X* |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs action | Needs action |
| Scheduling | Scheduled | Confirming | Needs action | Needs action |
| Scheduling | Re-scheduled | Confirming | Needs action | Needs action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re-scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 6:
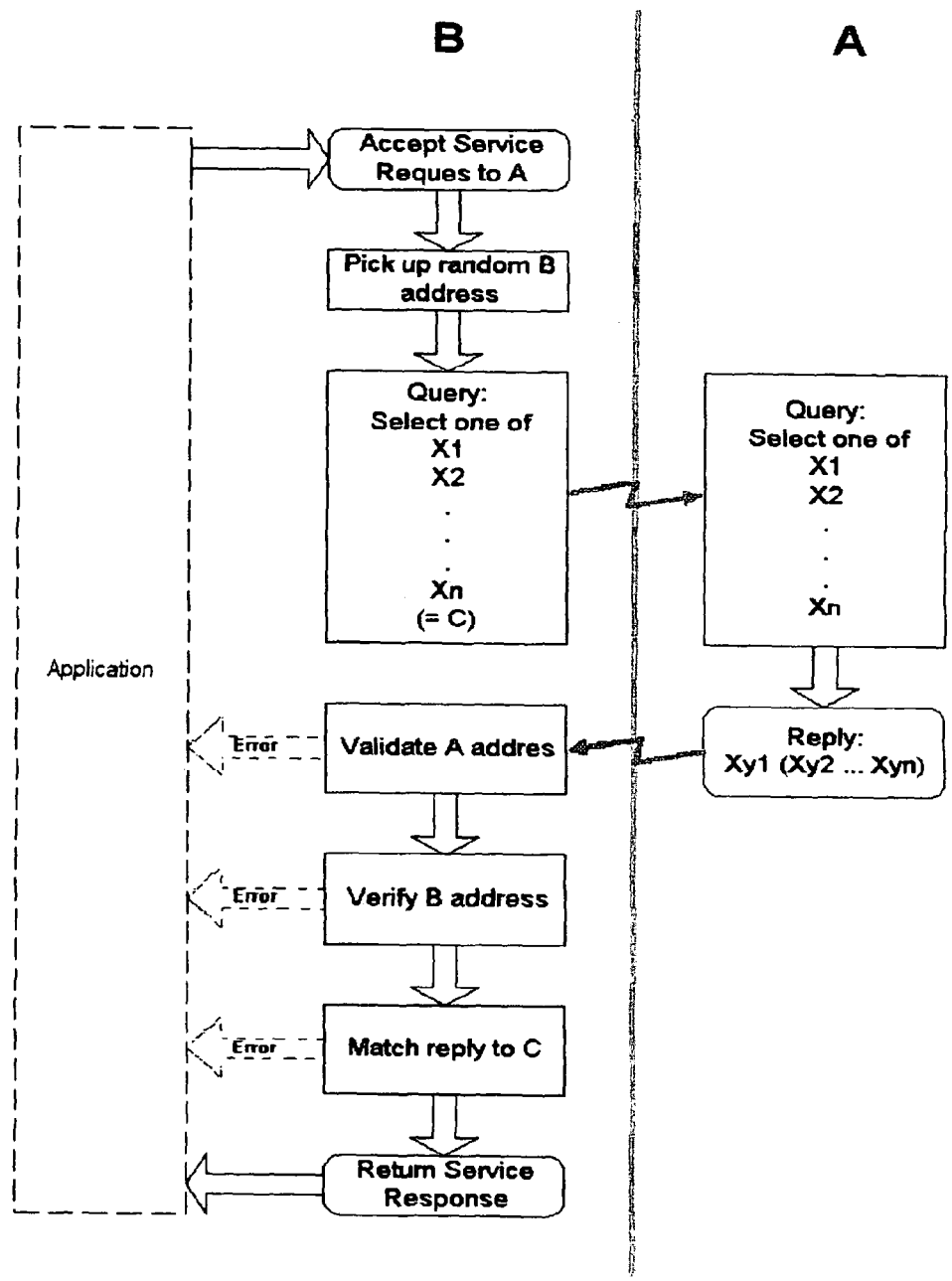
FIG. 6 shows an example of the dynamic dialog matrix applied to a query and reply according to the invention.

FIG. 6 shows the work flow transitions from phase to phase. For conditions, see the table above. Also, please note that Canceled Status always leads to Accounting.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are:
a "NoReplies" (0) for "No-one hasn't replied to the request made by the organizer"
b "NoDeclines" (1) for "Not all invitees have replied yet. The ones who have replied have accepted"
c "AllAccepts" (2) for "all invitees have confirmed"
d "SomeDeclines" (3) for "Some of the invitees have declined"
e "AllDeclines" (4) for "All of the invitees have declined".

The following decision table helps in evaluating the status of the whole booking. "Maybe" means that this condition only does not incontestably specify true or false result.

| Booking Status\Confirmations | No one answered | No one accepted | Some Accepted | All accepted | No one declined | Some declined | All declined |
|---|---|---|---|---|---|---|---|
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

Figure 7:
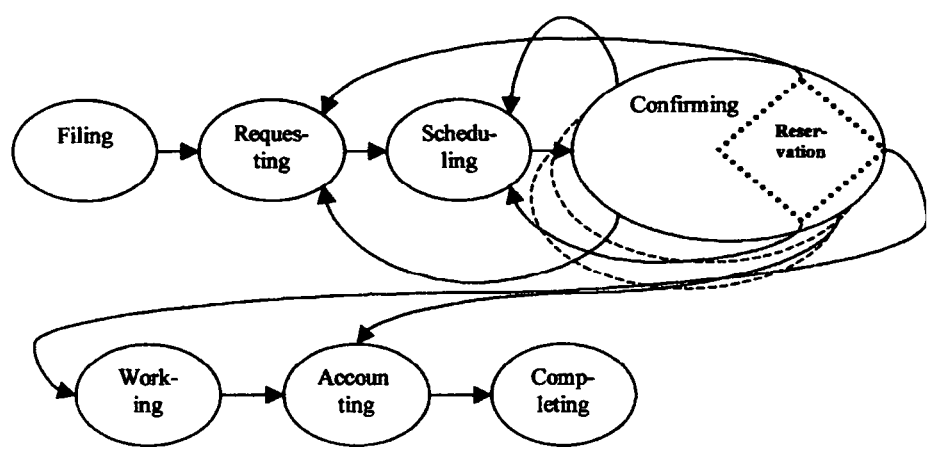
FIG. 7 shows the phases of the booking process in a preferred embodiment of the invention.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

EXAMPLE 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:

Please choose one of the following departure times:
  6:00 a.m., answer A
  7:30 a.m., answer B
  8:15 a.m., answer C.
  If none of these is OK, answer D.
  Sender: +358440844 027
Please choose ticket class:
  First class, answer A
  Business class, answer B
  Economy class, answer C
  Cheapest available, answer D
  Sender: +358440844 011
Please choose:
  Window seat, answer A
  Aisle seat, answer C
  Sender: +358440844 034
Please select the meal:
  Vegetarian, answer A
  Beef, answer B
  Chicken, answer C
  Sender: +358440844 003

The answers received from the customer to the preceding questions and several others were as follows:
  'A' to question with ref.no +358 440 844 027
  'D' to question with ref.no +358 440 844 011
  'A' to question with ref.no +358 440 844 034
  'B' to question with ref.no +358 440 844 003
  'D' to question with ref.no +358 440 859 751
  'A' to question with ref.no +358 440 844 277
  'C' to question with ref.no +358 440 841 368

From this, the service provider can find out that the customer chose:

| | |
|---|---|
| the first morning flight | (=A), |
| cheapest available ticket | (=D), |
| window seat | (=A), |
| beef for meal | (=B), |
| and etc. | |

It is important to note with the matrix the customer can answer the questions in any order, and can even fail to answer some questions. If these are relevant, the system can urge for an answer. If not, the system can proceed without this information.

Figure 8:
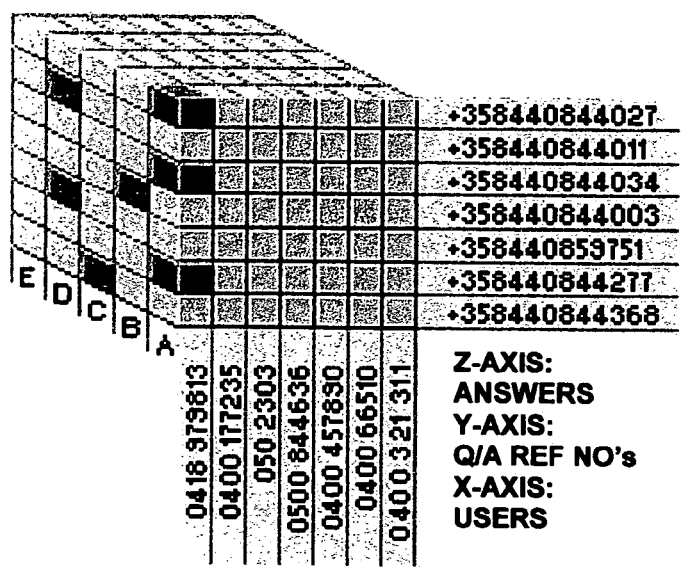
FIG. 8 shows a matrix diagram corresponding to Example 2, according to a preferred embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

Although the present invention has been described in considerable detail with reference to certain preferred versions thereof, other versions are possible. Therefore the spirit and scope of the appended claims should not be limited to the preferred versions herein.

What is claimed is:

1. A method comprising:
authenticating a client by a network server, wherein the client to be authenticated uses a mobile telephonic device capable of sending and receiving short message service (SMS) messages and having a client identifier address wherein:
the network server determines a plurality of currently available, predefined reply addresses;
the network server selects a unique reply address for an SMS message, wherein the unique reply address is specific to that SMS message, the unique reply address being selected from the plurality of currently available predefined reply addresses determined to be currently available by the network server;
the network server assigns the selected unique reply address to the SMS message;
the network server sends the SMS message to the mobile telephonic device used by the client at the client identifier address; and
the network server authenticates the client based on a response to the SMS message, wherein the response to the SMS message is sent by the mobile telephonic device from the client identifier address and received at the unique reply address.

2. The method of claim 1, wherein authentication of the client based on the response to the SMS message includes analysis of the semantics of the response.

3. The method of claim 2, wherein the analysis of the semantics of the response includes comparing content of the response with stored information about what kinds of response content are acceptable.

4. The method of claim 3, wherein if response content does not meet criteria identified in the stored information, the response is rejected as not being an authentic response.

5. The method of claim 3, wherein, if response content does not meet criteria identified in the stored information, the client is not authenticated.

6. The method of claim 1, further comprising the network server storing the response to the SMS message in a matrix including a first axis indexed by client calling line identifier number and a second axis indexed by reply address.

7. The method of claim 1, wherein the client's identifier address includes an identifier chosen from the group consisting of a client's a-subscriber's number, Calling Line Identity, e-mail address and IP address.

8. The method of claim 1, wherein the each of the plurality of currently available predefined reply addresses are complete, and unaltered, when assigned to the SMS message.

9. The method of claim 1, wherein the response to the SMS message is a SMS message that is sent to the unique reply address.

10. The method of claim 1, wherein the response to the SMS message is an email message.

11. The method of claim 1, wherein the response to the SMS message is a text message.

12. The method of claim 1, further comprising authenticating a specific client dialogue based on a response to the SMS message received at the unique reply address.

13. A network server comprising:
at least one connection for communicating with a client, the client using a mobile telephonic device capable of sending and receiving short message service (SMS) messages and having a client identifier address,
a process logic for authenticating the client, wherein execution of the process logic causes the network server to perform the following operations:
determine a plurality of currently available, predefined reply addresses;
select a unique reply address for an SMS message, wherein the unique reply address is specific to that SMS message, the unique reply address being selected from the plurality of currently available reply addresses;
assign the selected unique reply address to the SMS message;
send the SMS message to the mobile telephonic device used by the client at the client identifier address; and
authenticate the client based on a response to the SMS message, wherein the response to the SMS message is sent by the mobile telephonic device from the client identifier address and received at the unique reply address.

14. The network server of claim 13, wherein authentication of the client based on the response to the SMS message includes analysis of the semantics of the response.

15. The network server of claim 14, wherein the analysis of the semantics of the response includes comparing content of the response with stored information about what kinds of response content are acceptable.

16. The network server of claim 14, wherein if response content does not meet criteria identified in the stored information, the response is rejected as not being an authentic response.

17. The network server of claim 14, wherein, if response content does not meet criteria identified in the stored information, the client is not authenticated.

18. The network server of claim 13, wherein the each of the plurality of currently available predefined reply addresses are complete, and unaltered, when assigned to the SMS message.

19. The network server of claim 13, wherein the client's identifier address includes an identifier chosen from the group consisting of a client's a-subscriber's number, Calling Line Identify, e-mail address and IP address.

20. The network server of claim 13, wherein the response to the SMS message is a SMS message that is sent to the unique reply address.

21. The network server of claim 13, wherein the response to the SMS message is an email message.

22. The network server of claim 13, wherein the response to the SMS message is a text message.

23. A network server for performing a method of authenticating a client, the client using a mobile telephonic device capable of sending and receiving short message service (SMS) messages and having a client identifier address, wherein the network server:
determines a plurality of currently available, predefined reply addresses;
selects a unique reply address for an SMS message, wherein the unique reply address is specific to that SMS message, the unique reply address being selected from the plurality of currently available reply addresses;
assigns the selected unique reply address to the SMS message;
sends the SMS message to the mobile telephonic device used by the client at the client identifier address; and
authenticates the client based on a response to the SMS message, wherein the response to the SMS message is sent by the mobile telephonic device from the client identifier address and received at the unique reply address.

24. The network server of claim 23, wherein the response to the SMS message is a SMS message that is sent to the unique reply address.

25. The network server of claim 23, wherein the response to the SMS message is an email message.

26. The network server of claim 23, wherein the response to the SMS message is a text message.

27. The network server of claim 23, wherein authentication of the client based on the response to the SMS message includes analysis of the semantics of the response.

28. The network server of claim 27, wherein the analysis of the semantics of the response includes comparing content of the response with stored information about what kinds of response content are acceptable.

29. The network server of claim 27, wherein if response content does not meet criteria identified in the stored information, the response is rejected as not being an authentic response.

30. The network server of claim 27, wherein, if response content does not meet criteria identified in the stored information, the client is not authenticated.

31. A network server comprising:
at least one application operating on the server for authenticating a client, the client using a mobile telephonic device capable of sending and receiving short message service (SMS) messages and having a client identifier address;
wherein the at least one application comprises:
a first function to determine a plurality of currently available, predefined reply addresses;
a second function to select a unique reply address for an SMS message, wherein the unique reply address is specific to that SMS message, the unique reply address being selected from the plurality of currently available reply addresses;
a third function to assign the selected unique reply address to an SMS message;
a fourth function to send the SMS message to the mobile telephonic device used by the client at the client identifier address; and
a fifth function to authenticate the client based on a response to the SMS message, wherein the response to the SMS message is sent by the mobile telephonic device from the client identifier address and received at the unique reply address.

32. A method comprising:

authenticating a client dialogue by a network server, wherein the client to be authenticated uses a mobile telephonic device capable of sending and receiving short message service (SMS) messages and having a client identifier address, wherein a message sent to and received from the client forms a client dialogue, the network server performing acts including:

the network server determining a plurality of currently available, predefined reply addresses;

the network server selecting a unique reply address for an SMS message, wherein the unique reply address is specific to that SMS message, the unique reply address being selected from the plurality of currently available predefined reply addresses determined to be currently available by the network server;

the network server assigning the selected unique reply address to the SMS message;

the network server sending the SMS message to the mobile telephonic device used by the client at the client identifier address; and the network server authenticating the client dialogue based on a response to the SMS message, wherein the response to the SMS message is sent by the mobile telephonic device from the client identifier address and received at the unique reply address.

* * * * *